United States Patent [19]
Hackett

[11] Patent Number: 5,927,257
[45] Date of Patent: Jul. 27, 1999

[54] PRESSURE COMPENSATING EXHAUST GAS RECIRCULATION VALVE

[75] Inventor: David E. Hackett, Washington, Ill.

[73] Assignee: Caterpillar Inc, Peoria, Ill.

[21] Appl. No.: 08/934,298

[22] Filed: Sep. 19, 1997

[51] Int. Cl.$^6$ .............................. F02B 47/08; F16K 31/30
[52] U.S. Cl. ............................. 123/568.26; 251/129.07; 251/282; 137/607
[58] Field of Search ..................... 123/568.16, 568.25, 123/568.26; 251/129.15, 30.01, 129.2, 149, 282, 129.07; 137/607, 630.22

[56] References Cited

U.S. PATENT DOCUMENTS

| | | | |
|---|---|---|---|
| 2,404,514 | 7/1946 | McClure | 137/596.17 |
| 3,087,675 | 4/1963 | Honegger | 236/12.21 |
| 3,322,134 | 5/1967 | Enemark | 137/108 |
| 3,561,481 | 2/1971 | Taplin | 137/625.04 |
| 3,924,650 | 12/1975 | Parquet | 137/101 |
| 4,192,337 | 3/1980 | Alderson et al. | 137/101 |
| 4,232,701 | 11/1980 | Adachi | 137/101 |
| 4,265,269 | 5/1981 | Dolberg et al. | 137/118 |
| 4,276,746 | 7/1981 | Yamanaka et al. | 60/290 |
| 4,316,437 | 2/1982 | Bertrand | 123/90.18 |
| 4,614,202 | 9/1986 | Halvorsen et al. | 137/118 |
| 4,616,806 | 10/1986 | Davis | 251/63.4 |
| 4,641,686 | 2/1987 | Thompson | 137/625.65 |
| 4,953,583 | 9/1990 | Szlaga | 137/118 |
| 5,168,898 | 12/1992 | Göttling et al. | 137/625.34 |
| 5,535,783 | 7/1996 | Asou et al. | 137/625.65 |

FOREIGN PATENT DOCUMENTS

| | | |
|---|---|---|
| 0770775A1 | 5/1997 | European Pat. Off. . |
| 2103766 | 2/1983 | United Kingdom . |

*Primary Examiner*—Andrew M. Dolinar
*Assistant Examiner*—Arnold Castro
*Attorney, Agent, or Firm*—Maginot, Addison & Moore

[57] ABSTRACT

A valve assembly for use in an internal combustion engine is disclosed. The valve assembly includes a housing which defines a chamber. The housing further defines an outlet, a first inlet, and a second inlet, each of which is in fluid communication with the chamber. The valve assembly further includes a master valve positioned within the chamber. The master valve isolates the first inlet from the outlet when the master valve is positioned in a seated master position. The master valve places the first inlet in fluid communication with the outlet when the master valve is located in an open master position. The valve assembly still further includes a slave valve positioned within the chamber. The slave valve isolates the second inlet from the outlet when the slave valve is positioned in a seated slave position. The slave valve places the second inlet in fluid communication with the outlet when the slave valve is located in an open slave position. Movement of the master valve from the seated master position to the open master position causes movement of the slave valve from the seated slave position to the open slave position. The master valve moves a distance from the seated master position toward the open master position while the slave valve is positioned in the seated slave position. A method of controlling a flow of engine exhaust is also disclosed.

20 Claims, 8 Drawing Sheets

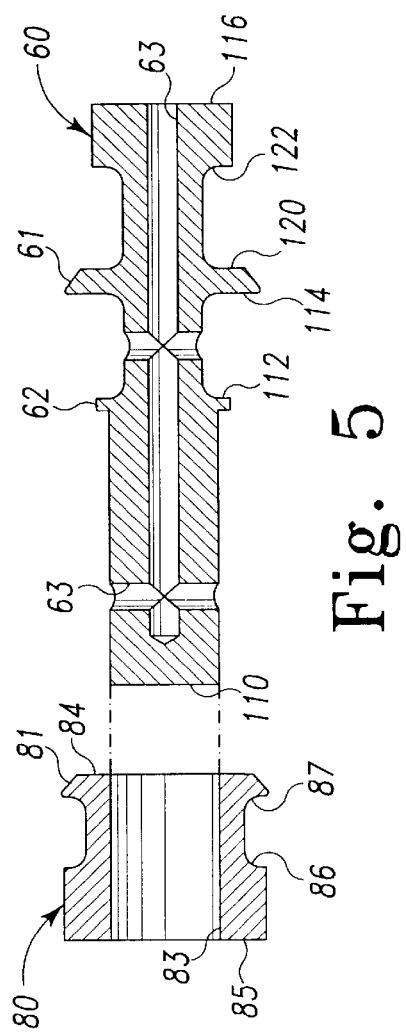
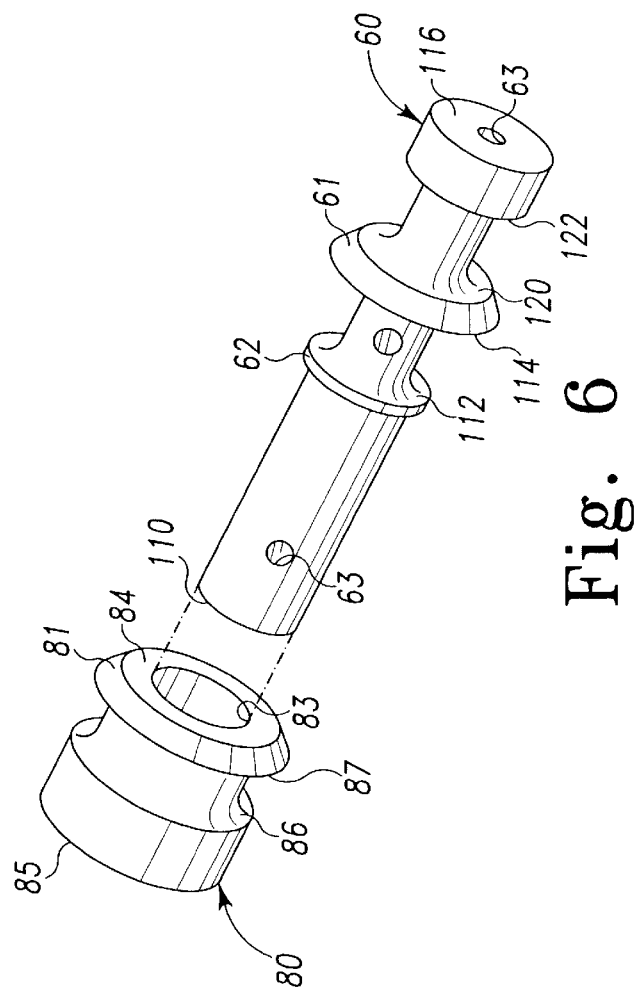

PRESSURE COMPENSATING EXHAUST GAS RECIRCULATION VALVE

TECHNICAL FIELD OF THE INVENTION

The present invention relates generally to an exhaust gas recirculation (EGR) valve for an internal combustion engine, and more specifically to a pressure compensating EGR valve for an internal combustion engine.

BACKGROUND OF THE INVENTION

During operation of an internal combustion engine, it is desirable to control the formation and emission of certain gases, such as the oxides of nitrogen ($NO_x$). One method of achieving this result is the use of EGR which is a process whereby exhaust gases are selectively routed from the exhaust manifold or manifolds to the intake manifold of the internal combustion engine. The use of EGR reduces the amount of $NO_x$ produced during operation of the internal combustion engine. In particular, $NO_x$ is produced when nitrogen and oxygen are combined at high temperatures associated with combustion. The presence of chemically inert gases, such as those gases found in the exhaust of the engine, inhibits nitrogen atoms from bonding with oxygen atoms thereby reducing $NO_x$ production.

However, EGR is only needed during certain engine operating conditions. Hence, a valve, commonly referred to as an EGR valve, is used to selectively route a portion of the exhaust gases from the exhaust manifold or manifolds to the intake manifold. With the use of microprocessors, an engine control module can rapidly process a number of sensor inputs to determine when the use of EGR would be most advantageous. Moreover, operating conditions often change quickly during normal operation of the engine thereby requiring the EGR valve to open and close rapidly.

The EGR valve must also be "fail safe". More specifically, the EGR valve should remain in a closed position if any of the components associated therewith (e.g. the engine control module) fail or otherwise become inoperable. Such fail safe operation generally requires use of a spring that biases the valve into the closed position. The magnitude of the spring bias must be large enough to hold the valve closed during extreme engine operating conditions such as when the exhaust gases within the engine exhaust manifold is at or near its maximum pressure. An actuator, such as a solenoid, selectively provides a force to overcome the spring bias in order to open the EGR valve. It should be appreciated that the time period necessary for the solenoid to overcome the spring bias of the spring is proportional to the magnitude of the spring bias. In particular, the time period necessary for the solenoid to overcome the spring bias of the spring increases as the magnitude of the spring bias increases. Hence, a tension exists between the desirability of rapid opening and closing of the EGR valve and the desirability of fail safe operation. Such tension is a drawback associated with EGR valves which have heretofore been designed.

Also, many engines used in heavy machinery, such as earth moving equipment, are turbocharged diesel engines. In a turbocharged diesel engine, it is often advantageous to divide the exhaust manifold into two smaller manifolds. Each of the two smaller manifolds routes a portion of the exhaust gases therein to a separate inlet on opposite sides of the turbocharger turbine disk. Applying exhaust gases to the turbine disk in such a manner accelerates the turbine disk more rapidly relative to applying all of the exhaust gases to only one side of the turbine disk. Such rapid turbine acceleration allows the engine to respond more quickly to increased load conditions. A drawback to the use of EGR with two separate exhaust manifolds is that exhaust gases are desirably extracted from each exhaust manifold equally. In particular, an equal amount of exhaust gases are desirably extracted from each of the exhaust manifolds in order to place an equal load on each half of the engine. Thus, it is desirable for the EGR valve or valves to extract exhaust gases equally from each of the exhaust manifolds.

What is needed therefore is an apparatus and method for selectively routing EGR gases which overcome one or more of the above-mentioned drawbacks.

SUMMARY OF THE INVENTION

In accordance with a first embodiment of the present invention, there is provided a valve assembly. The valve assembly includes a housing which defines a chamber. The housing further defines an outlet, a first inlet, and a second inlet, each of which is in fluid communication with the chamber. The valve assembly further includes a master valve positioned within the chamber. The master valve isolates the first inlet from the outlet when the master valve is positioned in a seated master position. The master valve places the first inlet in fluid communication with the outlet when the master valve is located in an open master position. The valve assembly still further includes a slave valve positioned within the chamber. The slave valve isolates the second inlet from the outlet when the slave valve is positioned in a seated slave position. The slave valve places the second inlet in fluid communication with the outlet when the slave valve is located in an open slave position. Movement of the master valve from the seated master position to the open master position causes movement of the slave valve from the seated slave position to the open slave position. The master valve moves a distance from the seated master position toward the open master position while the slave valve is positioned in the seated slave position.

In accordance with a second embodiment of the present invention, there is provided an engine assembly. The engine assembly includes an internal combustion engine having an engine air inlet, a first engine exhaust outlet, and a second engine exhaust outlet. The engine assembly further includes a valve housing which defines a chamber. The housing further defines a valve housing outlet, a first valve housing inlet, and a second valve housing inlet, each of which is in fluid communication with the chamber. The engine assembly also includes a master valve positioned within the chamber. The master valve isolates the first valve housing inlet from the valve housing outlet when the master valve is positioned in a seated master position. The master valve places the first valve housing inlet in fluid communication with the valve housing outlet when the master valve is located in an open master position. The engine assembly still further includes a slave valve positioned within the chamber. The slave valve isolates the second valve housing from the valve housing outlet when the slave valve is positioned in a seated slave position. The slave valve places the second valve housing in fluid communication with the valve housing outlet when the slave valve is located in an open slave position. The first engine exhaust outlet is in fluid communication with the first valve housing inlet. The second engine exhaust outlet is in fluid communication with the second valve housing inlet. The engine air inlet is in fluid communication with the valve housing outlet. Movement of the master valve from the seated master position to the open master position causes movement of the slave valve from the seated slave position to the open slave position. The master valve moves a distance from the seated master position toward the open master position while the slave valve is positioned in the seated slave position.

In accordance with a third embodiment of the present invention, there is provided a method of controlling a flow of engine exhaust. The method includes the step of providing a valve assembly which includes a housing that defines a chamber. The housing further defines a valve housing outlet, a first valve housing inlet, and a second valve housing inlet, each of which is in fluid communication with the chamber. The valve assembly includes a master valve positioned within the chamber. The master valve isolates the first valve housing inlet from the valve housing outlet when the master valve is positioned in a seated master position. The master valve places the first valve housing inlet in fluid communication with the valve housing outlet when the master valve is located in an open master position. The valve assembly includes a slave valve positioned within the chamber. The slave valve isolates the second valve housing from the valve housing outlet when the slave valve is positioned in a seated slave position. The slave valve places the second valve housing in fluid communication with the valve housing outlet when the slave valve is located in an open slave position. The method further includes the steps of providing an internal combustion engine having an engine air inlet, a first engine exhaust outlet, and a second engine exhaust outlet. The first engine exhaust outlet is in fluid communication with the first valve housing inlet, the second engine exhaust outlet is in fluid communication with the second valve housing inlet, and the engine air inlet is in fluid communication with the valve housing outlet. The method still further includes the step of moving the master valve a first distance from the seated master position to an intermediate master position while the slave valve is positioned in the seated slave position. The method yet further includes the step of moving the master valve a second distance from the intermediate master position to the open master position so as to cause movement of the slave valve from the seated slave position to the open slave position whereby engine exhaust is enabled to flow from the first and second engine exhaust outlet to the engine air inlet.

BRIEF DESCRIPTION OF THE DRAWINGS

FIG. 5 is an exploded cross sectional view of the master valve 60 and the slave valve 80 of the EGR valve assembly 14 of the internal combustion engine 10 of FIG. 1;

FIG. 6 is an exploded perspective view of the master valve 60 and the slave valve 80 of FIG. 5;

BEST MODE FOR CARRYING OUT THE INVENTION

Figure 1:
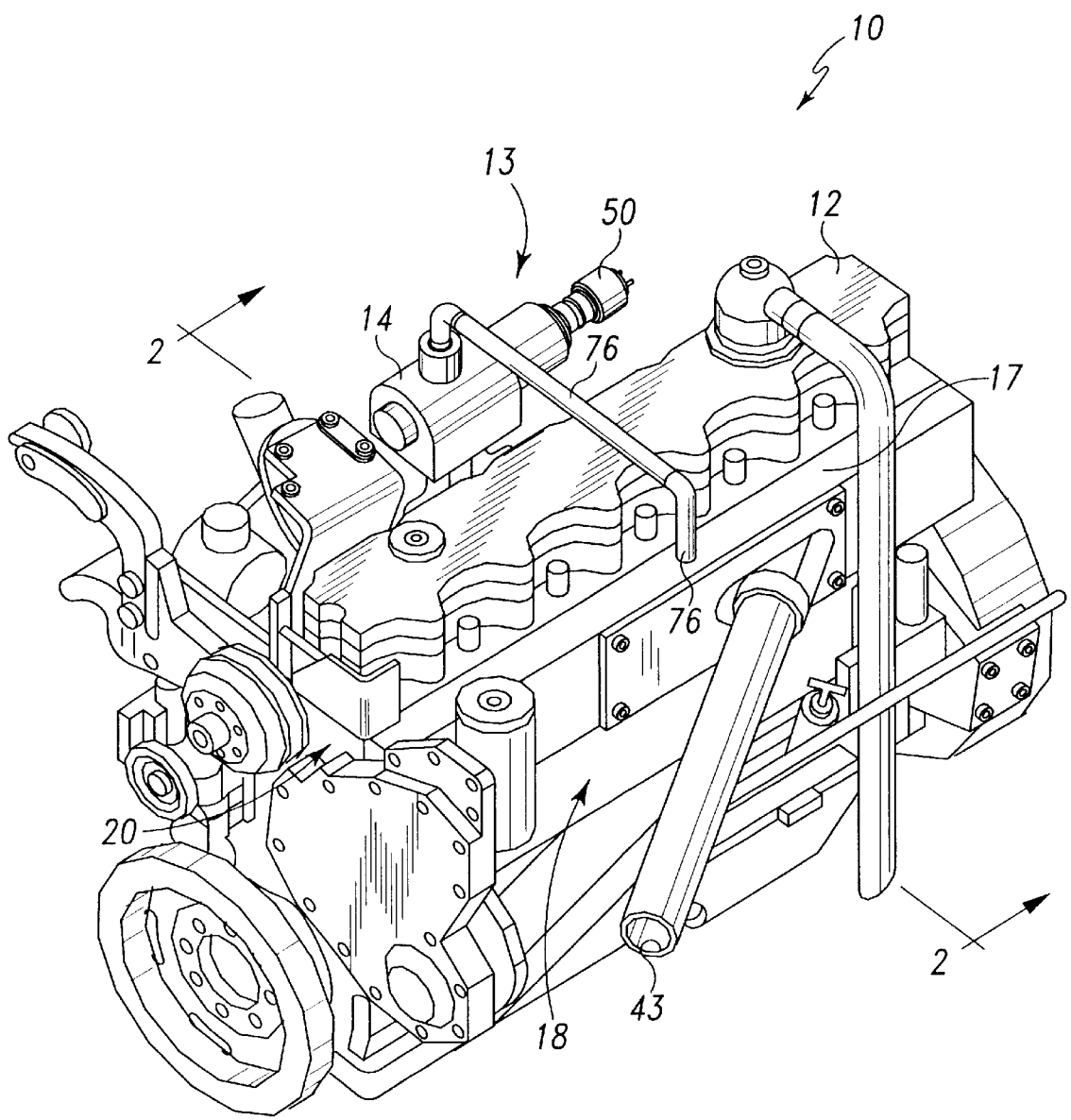
FIG. 1 is a perspective view of an internal combustion engine 10 which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
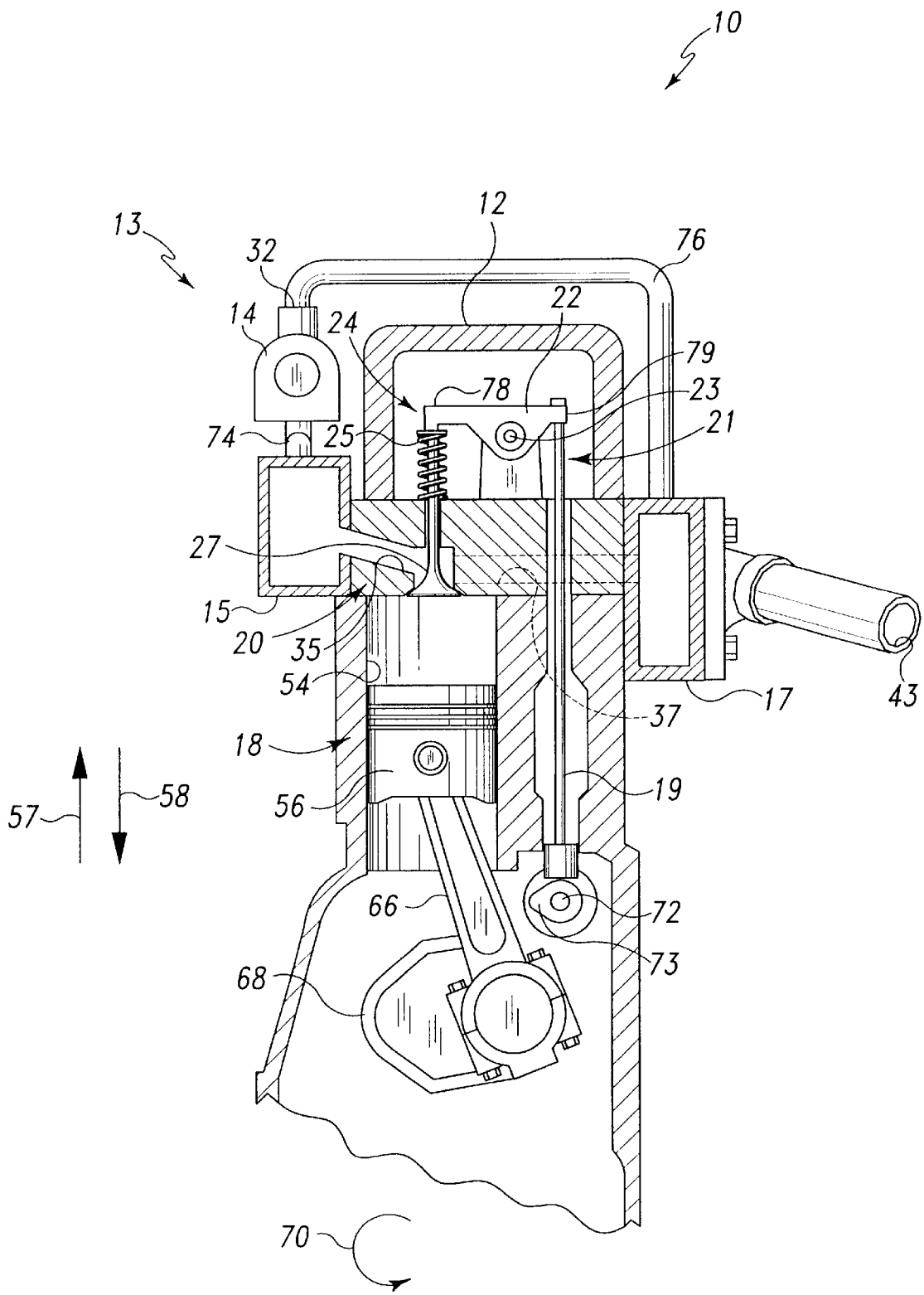
FIG. 2 is a partial cross sectional view of the internal combustion engine 10 taken along line 2—2 of FIG. 1, as viewed in the direction of the arrows.
Figure 3:
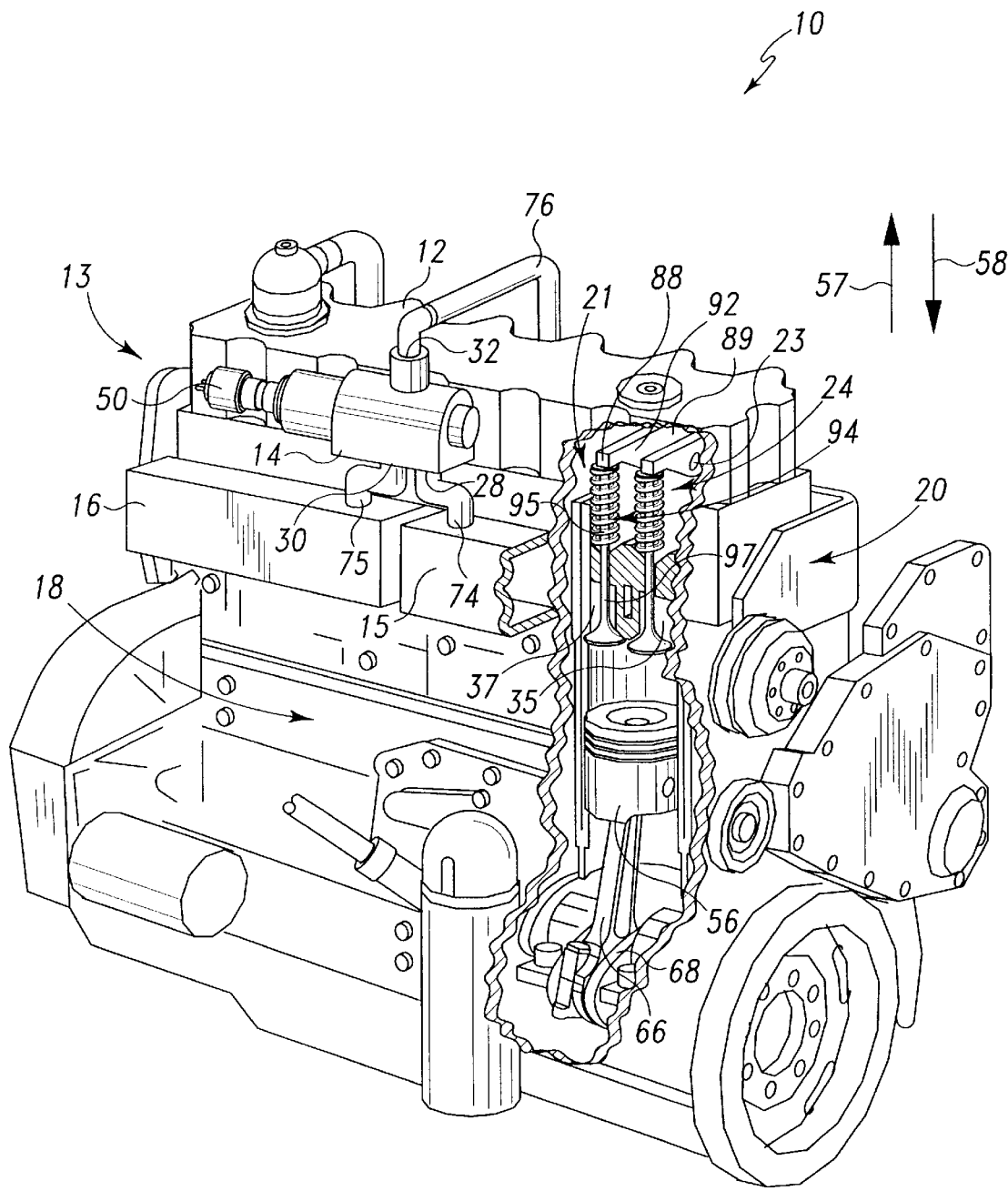
FIG. 3 is a perspective view of the internal combustion engine 10 of FIG. 1 with a portion of the engine head 20 and the engine block 18 cut away for clarity of description.

Referring now to FIGS. 1–3, there is shown an internal combustion engine 10 such as a six-cylinder turbocharged diesel engine. The internal combustion engine 10 includes an EGR assembly 13, an engine block 18, an engine head 20, and a valve cover 12.

As shown in FIG. 2, the engine block 18 has a cylinder 54 defined therein. In a known manner, a piston 56 is operatively housed within the cylinder 54. In particular, during an upward stroke, the piston 56 translates in the general direction of arrow 57 of FIG. 2. During a downward stroke, the piston 56 translates in the general direction of arrow 58 of FIG. 2.

The piston 56 is coupled to a first end of a connecting rod 66, whereas a second end of the connecting rod 66 is connected to a crankshaft 68. During the upward stroke of the piston 56, the connecting rod 66 is likewise translated in the general direction of arrow 57 of FIG. 2. During the downward stroke of the piston 56, the connecting rod 66 is likewise translated in the general direction of arrow 58 of FIG. 2. In both cases, the crankshaft 68 rotates in the direction of arrow 70 of FIG. 2.

The engine head 20 includes a number of head air inlet ports 37 and head exhaust outlet ports 35. An engine air inlet or intake manifold 17 places the head air inlet ports 37 in fluid communication with an air intake line 43 associated with the internal combustion engine 10. A pair of engine exhaust outlets or exhaust manifolds 15, 16 places the head exhaust outlet ports 35 in fluid communication with a turbocharger and a tailpipe (not shown) associated with the internal combustion engine 10. It should be appreciated that the exhaust manifold 15 is in fluid communication with the head exhaust ports 35 of each of the front three cylinders of the internal combustion engine 10, whereas the exhaust manifold 16 is in fluid communication with the head exhaust ports 35 of the rear three cylinders.

An upper portion of the engine head 20 includes a valve and rocker arm area 21. Within the valve and rocker arm area 21 is an exhaust valve assembly 24, an intake valve assembly 94, an exhaust rocker arm 22, and an intake rocker arm 92. It should be appreciated that when the valve cover 12 is sealably secured to the engine head 20 an engine lubricant, such as oil, is contained therein so as to lubricate a number of components associated with the internal combustion engine 10.

When the exhaust valve assembly 24 is placed in a closed position, as shown in FIG. 2, the cylinder 54 is isolated from the head exhaust outlet ports 35 and hence the exhaust manifolds 15, 16. When the exhaust valve assembly 24 is placed in an open position, the cylinder 54 is in fluid communication with the exhaust manifolds 15, 16 through the head exhaust outlet ports 35. The exhaust valve assembly 24 includes an exhaust valve member 27 and an exhaust spring 25 concentrically mounted about the exhaust valve member 27. The exhaust spring 25 applies a force or bias to the exhaust valve member 27 that biases the exhaust valve assembly 24 into the closed position, as shown in FIG. 2. Hence, the exhaust valve assembly 24 is held in the closed position until urged by the exhaust rocker arm 22 into the open position.

The exhaust rocker arm 22 is movably secured to the engine head 20. In particular, the exhaust rocker arm 22 is free to pivot about a rocker shaft 23 which is non-movably secured to the engine head 20. A first end 78 of the exhaust rocker arm 22 is operatively coupled to the exhaust valve member 27, whereas a second end 79 of the exhaust rocker arm 22 is operatively coupled to a first end of an exhaust pushrod 19 (see FIG. 2). A second end of the exhaust pushrod 19 is operatively coupled to a camshaft 72.

The camshaft 72 includes a first cam lobe 73 which is moved into and out of contact with the second end of the exhaust pushrod 19 during rotation of the camshaft 72. When the cam lobe 73 is rotated into contact with the second end of the exhaust pushrod 19, the exhaust pushrod 19 is urged in the general direction of arrow 57 of FIG. 2. As the exhaust pushrod 19 is urged in the general direction of arrow 57, the exhaust rocker arm 22 pivots about the rocker shaft 23 thereby causing the first end 78 of the exhaust rocker arm 22 to be urged in the general direction of arrow 58 thereby likewise urging the exhaust valve member 27 in the general direction of arrow 58. When the force exerted on the exhaust valve member 27 by the first end 78 of the exhaust rocker arm 22 is greater in magnitude than the spring bias generated by the exhaust spring 25, the exhaust valve member 27 is moved in the general direction of arrow 58 thereby positioning the exhaust valve assembly 24 in the open position. When the camshaft 72 is rotated beyond the maximum height of the cam lobe 73, the spring bias of the exhaust spring 25 urges the exhaust valve member 27 in the general direction of arrow 57 thereby returning the valve assembly 24 to the closed position. It should be appreciated that as the exhaust valve member 27 is urged in the general direction of arrow 57 by the exhaust spring 25, the first end 78 of the exhaust rocker arm 22 is likewise urged in the general direction of arrow 57 which causes the exhaust rocker arm 22 to pivot about the rocker shaft 23 thereby causing the second end 79 of the exhaust rocker arm 22 to be urged in the general direction of arrow 58.

It should therefore be appreciated that as the exhaust valve assembly 24 is placed in the open position, exhaust gases within the cylinder 54 are allowed to advance from the cylinder 54, through the head exhaust outlet ports 35, and into the exhaust manifolds 15, 16. It should further be appreciated that as the exhaust valve assembly 24 is placed in the closed position, the cylinder 54 is isolated from the exhaust manifolds 15, 16 thereby inhibiting advancement of the exhaust gases out of the cylinder 54.

Similarly, when the intake valve assembly 94 is placed in a closed position, as shown in FIG. 3, the cylinder 54 is isolated from the head air inlet ports 37 and hence the intake manifold 17. When the intake valve assembly 94 is placed in an open position, the cylinder 54 is in fluid communication with the intake manifold 17 through the head air inlet ports 37. As shown in FIG. 3, the intake valve assembly 94 includes an intake valve member 97 and an intake spring 95 concentrically mounted about the intake valve member 97. The intake spring 95 applies a force or bias to the intake valve member 97 that biases the intake valve assembly 94 into the closed position. Hence, the intake valve assembly 94 is held in the closed position until urged by the intake rocker arm 92 into the open position.

The intake rocker arm 92 is movably secured to the engine head 20. In particular, the intake rocker arm 92 is free to pivot about the rocker shaft 23. A first end 88 of the intake rocker arm 92 is operatively coupled to the intake valve member 97, whereas a second end 89 of the intake rocker arm 92 is operatively coupled to a first end of an intake pushrod (not shown). The second end of the intake pushrod is operatively coupled to the camshaft 72.

The camshaft 72 includes a second cam lobe (not shown) which is moved into and out of contact with the second end of the intake pushrod during rotation of the camshaft 72. When the cam lobe is rotated into contact with the intake pushrod, the intake pushrod is urged in the general direction of arrow 57 of FIG. 3. As the intake pushrod is urged in the general direction of arrow 57, the intake rocker arm 92 pivots about the rocker shaft 23 thereby causing the first end 88 of the intake rocker arm 92 to be urged in the general direction of arrow 58 of FIG. 3 thereby likewise urging the intake valve member 97 in the general direction of the arrow 58. When the force exerted on the intake valve member 97 by the first end 88 of the intake rocker arm 92 is greater in magnitude than the spring bias generated by the intake spring 95, the intake valve member 97 is moved in the general direction of arrow 58 thereby positioning the intake valve assembly 94 in the open position. When the camshaft 72 is rotated beyond the maximum height of the cam lobe that is acting upon the intake pushrod, the spring bias of the intake spring 95 urges the intake valve member 97 in the general direction of arrow 57 thereby returning the intake valve assembly 94 to the closed position. It should be appreciated that as the intake valve member 97 is urged in the general direction of arrow 57 by the intake spring 95, the first end 88 of the intake rocker arm 92 is likewise urged in the general direction of arrow 57 which causes the intake rocker arm 92 to pivot about the rocker shaft 23 thereby causing the second end 89 of the intake rocker arm 92 to be urged in the general direction of arrow 58.

It should therefore be appreciated that as the intake valve assembly 94 is placed in the open position, air (along with any exhaust gases which have been routed to the intake manifold 17 by the EGR assembly 13) within the intake manifold 17 is advanced through the head air inlet ports 37, and into the cylinder 54. It should be further appreciated that as the intake valve assembly 94 is placed in the closed position, the cylinder 54 is isolated from intake manifold 17 thereby inhibiting advancement of air from the intake manifold 17 into the cylinder 54.

The internal combustion engine 10 is a four stroke engine. The first stroke is an intake stroke, during which the exhaust valve assembly 24 is positioned in the closed position and the intake valve assembly 94 is positioned in the open position. Furthermore, during the intake stroke, the piston 56 is advanced in the general direction of arrow 58 thereby creating a partial vacuum in the cylinder 54. This partial vacuum causes air to be advanced from the intake manifold 17, through the head air inlet ports 37, and into the cylinder 54. Advancing to a compression stroke, the intake valve assembly 94 and the exhaust valve assembly 24 are both positioned in their respective closed positions. As the piston 56 moves upward in the general direction of arrow 57, it compresses the air in the cylinder 54. As the piston 56 continues to advance toward a top of its stroke, a fuel, such as diesel fuel, is introduced into the cylinder 54 thereby creating a fuel and air mixture with the air present in the cylinder 54. Near the top of the stroke of the piston 56, the fuel and air mixture is ignited by the heat generated as a result of compressing the fuel and air mixture. Ignition of the fuel and air mixture advances the internal combustion engine 10 to a power stroke in which the intake valve assembly 94 and the exhaust valve assembly 24 are both positioned in their respective closed positions. The fuel and air mixture is combusted and exhaust gases are formed. The formation of the exhaust gases generates pressure. This pressure acts upon the piston 56 to create a force which drives the piston 56 in the general direction of arrow 58. Thereafter, the internal combustion engine 10 is advanced to an exhaust stroke during which the exhaust valve assembly 24 is positioned in the open position and the intake valve assembly 94 is positioned in the closed position. Since the pressure generated by the exhaust gases in the cylinder 54 is greater than the pressure in the exhaust manifolds 15, 16, the exhaust gases advance from the cylinder 54, through the head exhaust outlet ports 35, and into the exhaust manifolds 15, 16.

During certain operating conditions of the internal combustion engine 10, it is desirable to inhibit the formation of $NO_x$ by introducing chemically inert exhaust gases into the cylinder 54 during the intake stroke. Hence, the EGR assembly 13 routes exhaust gases from the exhaust manifolds 15, 16 to the intake manifold 17. In particular, the EGR assembly 13 includes an EGR valve assembly 14 which selectively places the exhaust manifolds 15, 16 in fluid communication with the intake manifold 17 during such operating conditions.

Figure 4:
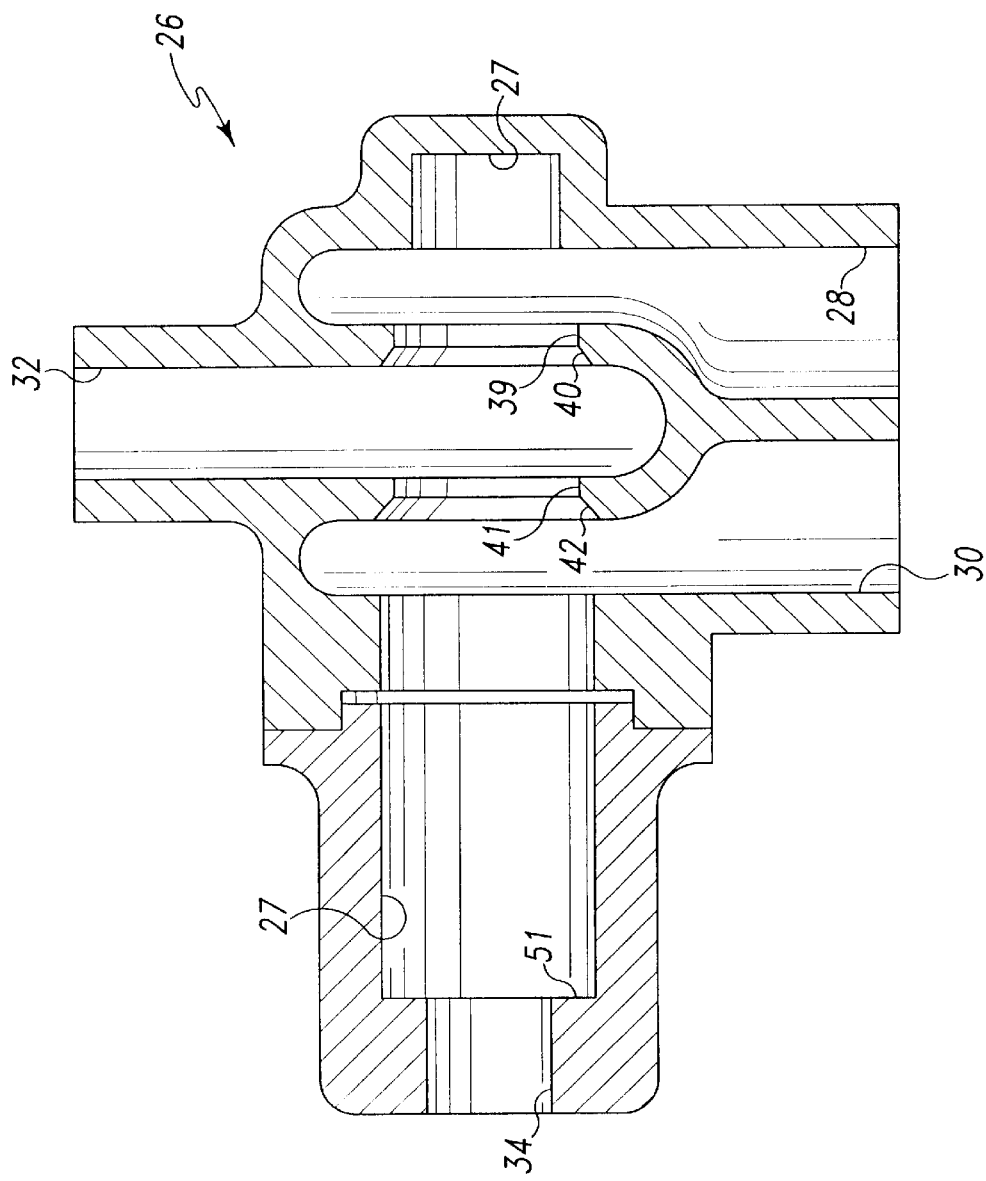
FIG. 4 is an enlarged cross sectional view of the housing 26 of the EGR valve assembly 14 of the internal combustion engine 10 of FIG. 1.

Referring now to FIG. 4, the EGR valve assembly 14 includes a housing 26 having a chamber 27 defined therein. It should be appreciated that the housing 26 may be embodied as a number of separate components as shown in order to facilitate the manufacture and assembly of the EGR valve assembly 14. Alternately, the housing 26 may be embodied as a single, integral component. The housing 26 further defines a first valve housing inlet 28, a second valve housing inlet 30, a valve housing outlet 32, and a plunger opening 34. The first inlet 28, the second inlet 30, the outlet 32, and the plunger opening 34 are each in fluid communication with the chamber 27.

As shown in FIG. 3 the exhaust manifold 15 is in fluid communication with the first inlet 28 of the EGR valve assembly 14, whereas the exhaust manifold 16 is in fluid communication with the second inlet 30. In particular, the exhaust manifold 15 is coupled to the first inlet 28 via a line 74, whereas the exhaust manifold 16 is coupled to the second inlet 30 via a line 75 (see FIG. 3). The outlet 32 is in fluid communication with the intake manifold 17. More specifically, the outlet 32 is coupled to the intake manifold 17 via a line 76 (see FIG. 2).

The housing 26 further has a master valve opening 39 defined therein which places the first inlet 28 in fluid communication with the outlet 32. As shown in FIG. 4, a portion of the master valve opening 39 defines a master valve seat 40. The housing 26 also has a slave valve opening 41 defined therein which places the second inlet 30 in fluid communication with the outlet 32. A portion of the slave valve opening defines a slave valve seat 42.

Figure 7:
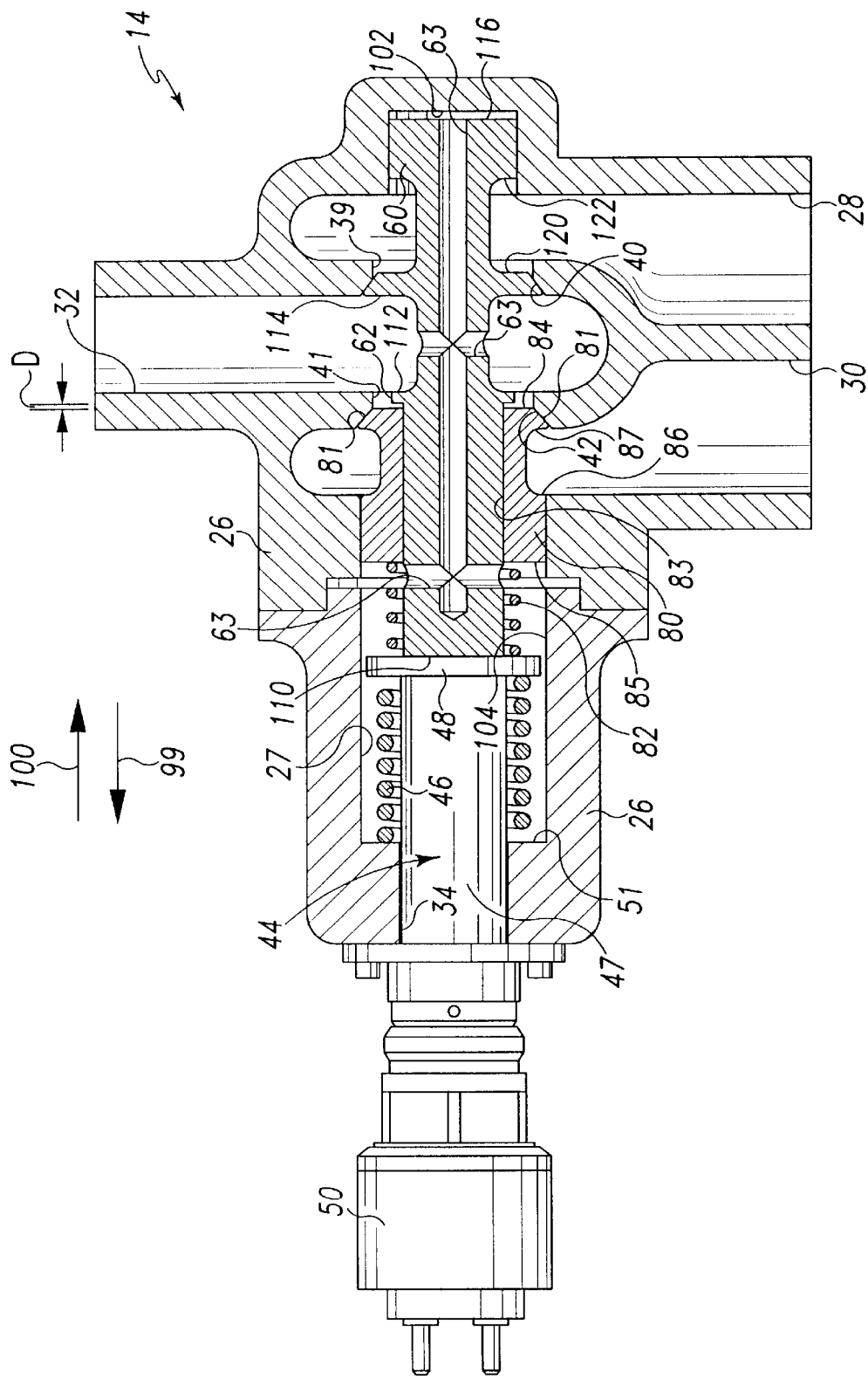
FIG. 7 is enlarged cross sectional view of the EGR valve assembly 14 with the master valve 60 and slave valve 80 shown in their respective seated positions, note that the solenoid 50 is not shown in cross section for clarity of description.

As shown in FIG. 7, the EGR valve assembly 14 further includes a master valve 60 positioned in the chamber 27 so as to be received through both the master valve opening 39 and the slave valve opening 41. The master valve 60 is free to translate in the general directions of arrows 99 and 100 of FIG. 7. The master valve 60 includes a master seating surface 61 (see FIGS. 5 and 6). When the master valve 60 is positioned in a seated master position as shown in FIG. 7, the master seating surface 61 sealably contacts the master valve seat 40 so as to prevent advancement of exhaust gases therebetween. It should therefore be appreciated that when positioned in the seated master position, the master valve 60 isolates the first inlet 28 from the outlet 32. It should also be appreciated that as the master valve 60 is moved out of the seated master position in the general direction of the arrow 99 so as to position the master valve 60 in an open master position (see FIG. 9), the first inlet 28 is placed in fluid communication with the outlet 32. In particular, when the master valve 60 is positioned in the open master position, exhaust gases are advanced from the first inlet 28 to the outlet 32 through the master valve opening 39. Such a configuration thus allows exhaust gases to be advanced from the exhaust manifold 15 to the intake manifold 17 via a fluid path that includes the line 74, the first inlet 28, the master valve opening 39, the outlet 32, and the line 76.

Figure 8:
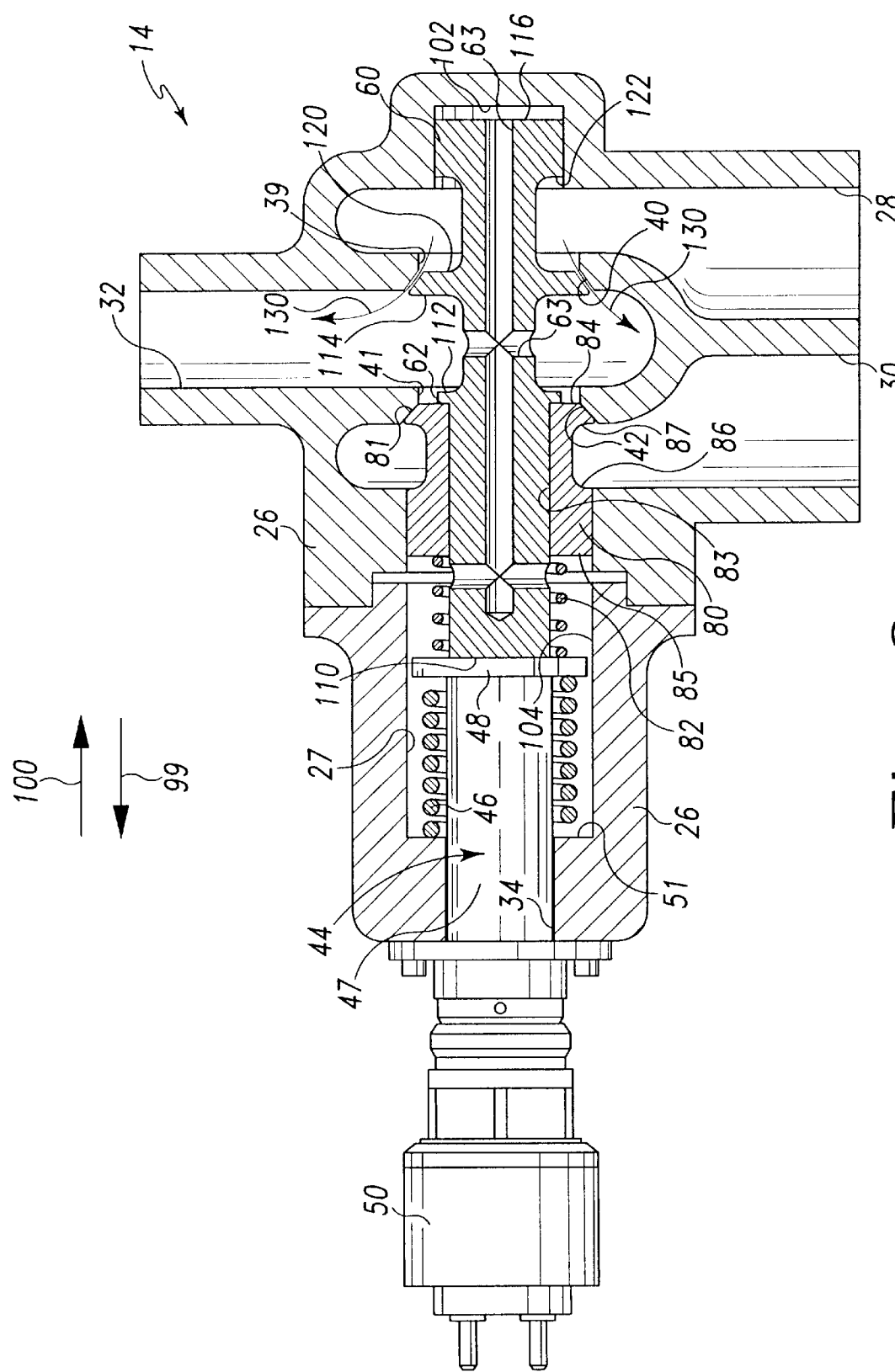
FIG. 8 is view similar to FIG. 7, but showing the master valve 60 as it begins to move out of the seated master position.
Figure 9:
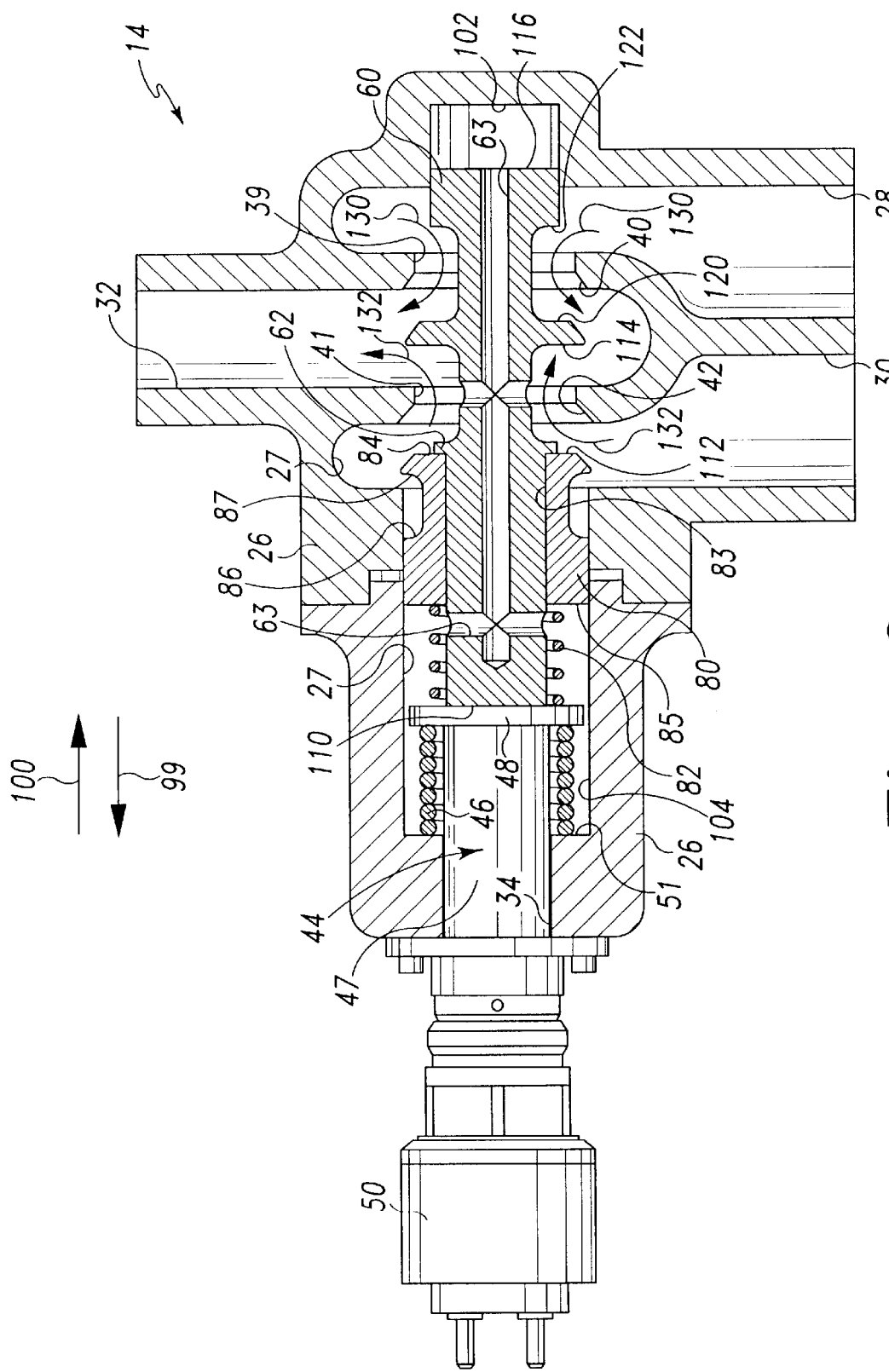
FIG. 9 is view similar to FIG. 7, but showing both the master valve 60 and the slave valve 80 positioned in their respective open positions.

As shown in FIGS. 7–9, the EGR valve assembly 14 further includes a plunger 44 and a spring 46. One end of the plunger 44 is received through the plunger opening 34 and is free to move in the general directions of arrows 99 and 100. A second end of the plunger 44 is operatively coupled to an actuator, such as a solenoid 50. The solenoid 50 is provided to selectively pull or otherwise move the plunger 44 in the general direction of arrow 99.

The plunger 44 further includes a plunger body 47 and a disk 48 which extends radially outward from the plunger body 47. The spring 46 is positioned concentrically about the plunger body 47, and is interposed between a contact surface 51 of the housing 26 and the disk 48. Hence, the spring 46 applies a force or bias to the plunger 44 thereby urging the plunger 44 in the general direction of arrow 100. As shown in FIG. 7, the disk 48 of plunger 44 contacts the master valve 60. Hence, the spring bias generated by the spring 46 urges the master valve 60 in the general direction of arrow 100. It should be appreciated that the spring bias of the spring 46 positions the master valve 60 in the seated master position. It should further be appreciated that when the solenoid 50 moves the plunger 44 in the general direction of arrow 99, the spring bias of the spring 46 is no longer exerted on the master valve 60, thus allowing the master valve 60 to be moved from the seated master position without having to overcome the spring bias of the spring 46.

The EGR valve assembly 14 further includes a slave valve 80 and a second spring 82. As shown in FIGS. 5 and 6, the slave valve 80 has a cylindrical passageway 83 defined therethrough. The slave valve 80 is concentrically mounted about the master valve 60. In particular, the master valve 60 is received through the cylindrical passageway 83. The second spring 82 is mounted concentrically about the master valve 60, and is interposed between the disk 48 of the plunger 44 and a surface 85 of the slave valve 80. The second spring 82 applies a force or bias to the surface 85 of the slave valve 80 so as to urge the slave valve 80 in the general direction of arrow 100 of FIGS. 7–9. It should therefore be appreciated that the spring bias of the second spring 82 urges the slave valve 80 in the general direction of arrow 100 so as to position the slave valve 80 in a seated slave position, as shown in FIGS. 7 and 8. It should further be appreciated that when the solenoid 50 moves the plunger 44 in the general direction of arrow 99, the bias of the second spring 82 is no longer exerted on the slave valve 80, thus allowing the slave valve 80 to be moved without having to overcome the spring bias of the second spring 82.

As with the master valve 60, the slave valve 80 is free to translate in the general directions of arrows 99 and 100.

Moreover, the slave valve 80 includes a slave seating surface 81 (see FIGS. 5 and 6). When the slave valve 80 is positioned in a seated slave position, as shown in FIGS. 7 and 8, the slave seating surface 81 sealably contacts the slave valve seat 42 (see FIG. 4) so as to prevent advancement of exhaust gases therebetween. It should therefore be appreciated that when the slave valve 80 is positioned in the seated slave position, the slave valve 80 isolates the second inlet 30 from the outlet 32. It should also be appreciated that as the slave valve 80 is moved out of the seated slave position in the general direction of arrow 99 so as to position the slave valve 80 in an open slave position (see FIG. 9), the second inlet 30 is placed in fluid communication with the outlet 32 (see FIG. 9). In particular, when the slave valve 80 is positioned in the open slave position, exhaust gases are advanced from the second inlet 30 to the outlet 32 through the slave valve opening 41. Such a configuration thus allows exhaust gases to be advanced from the exhaust manifold 16 to the intake manifold 17 via a fluid path which includes the line 75, the second inlet 30, the slave valve opening 41, the outlet 32, and the line 76.

The master valve 60 further has a shoulder 62 defined thereon (see FIGS. 5 and 6). As the master valve 60 moves in the general direction of arrow 99, the shoulder 62 is urged into contact with a surface 84 of the slave valve 80. In particular, the master valve 60 must first move in the general direction of arrow 99 a short distance D (see in FIG. 7) before the shoulder 62 of the master valve 60 contacts the surface 84 of the slave valve 80. Such a configuration allows the slave valve 80 to seat and unseat independently of the seating and unseating of the master valve 60. In particular, such configuration allows the slave seating surface 81 of the slave valve 80 to move independently of the of the master seating surface 61 of master valve 60. Such independent seating and unseating of the master valve 60 and the slave valve 80 is particularly useful to reduce the effects of a large temperature gradient which is present across the housing 26. More specifically, a large temperature gradient arises across the housing 26 when hot engine exhaust gases are introduced into the first inlet 28 and the second inlet 30 while cooler intake air is present in the outlet 32. Such a large temperature gradient may distort or otherwise alter the size and/or shape of the master valve opening 39 (including the master valve seat 40) and the slave valve opening 41 (including the slave valve seat 42) such that the relative orientation therebetween is altered. Independent seating and unseating of the master valve 60 and the slave valve 80 allows the EGR valve assembly 14 to accommodate for such distortions. Hence, the magnitude of the distance D is predetermined to be large enough to allow the master valve 60 to seat and unseat independently of the slave valve 80 in order to accommodate for distortion of the housing 26, yet small enough to allow the master valve 60 and the slave valve 80 to open at essentially the same time. Preferably, the distance D has a magnitude of approximately 1.0 millimeter.

As shown in FIGS. 7–9, the master valve 60 and the slave valve 80 divide the chamber 27 into a chamber portion 102 and a chamber portion 104. The master valve 60 further has a pressure compensation channel 63 defined therein. The channel 63 places the chamber portion 102, the chamber portion 104, and the outlet 32 in fluid communication with each other. Therefore, the chamber portion 102, chamber portion 104, and outlet 32 are each maintained at the same relative pressure. As mentioned above, the outlet 32 is in fluid communication with the intake manifold 17. Therefore, the chamber portion 102, the chamber portion 104, and the outlet 32 are each maintained at the same relative pressure as the intake manifold 17.

The master valve 60 has a pair of end surfaces 110 and 116, as shown in FIGS. 5 and 6. Moreover, the master valve 60 has a pair of intermediate surfaces 112 and 114. When the master valve 60 is positioned in the chamber 27, fluid pressure in the chamber portion 102 acts upon the surface 116, whereas fluid pressure in the chamber portion 104 acts upon the surface 110. Moreover, fluid pressure in the outlet 32 acts upon both the surface 112 and the surface 114. Fluid pressure acting on the surface 110 and the surface 114 urges the master valve 60 in the general direction of arrow 100, whereas fluid pressure acting on the surface 112 and the surface 116 urges the master valve 60 in the general direction of arrow 99. The master valve 60 is preferably configured such that the sum of the surface areas of the surfaces 116 and 112 is slightly greater in magnitude than the sum of the surface areas of the surfaces 110 and 114. Since the magnitude of fluid pressure in the chamber portions 102 and 104 is approximately equal to the magnitude of fluid pressure in the outlet 32, the net force exerted on the master valve 60 by fluid pressure on the surfaces 110, 112, 114, and 116 creates a slight bias in the general direction of arrow 99. It should be appreciated that during operation of the internal combustion engine 10, the net force exerted on the master valve 60 by fluid pressure acting on the surfaces 110, 112, 114, and 116 will remain biased in the general direction of arrow 99 despite changes in the magnitude of fluid pressure in the intake manifold 17 and hence the outlet 32.

When the slave valve 80 is positioned in the chamber 27, fluid pressure in the chamber portion 102 acts upon the surface 85, whereas fluid pressure in the outlet 32 acts upon the surface 84. In particular, fluid pressure in the outlet 32 acting on the surface 84 urges the slave valve 80 in the general direction of arrow 99, whereas fluid pressure in chamber portion 104 acting on the surface 85 urges the slave valve 80 in the general direction of arrow 100. The slave valve 80 is preferably configured such that the surface area of the surface 84 is slightly greater in magnitude than the surface area of the surface 85. Since the magnitude of fluid pressure in the chamber portion 104 is approximately equal to the magnitude of fluid pressure in the outlet 32, the net force exerted on the slave valve 80 by fluid pressure exerted on the surfaces 84 and 85 creates a slight bias in the general direction of arrow 99. It should be appreciated that during operation of the internal combustion engine 10, the net force exerted on the slave valve 80 by fluid pressure acting on the surfaces 84 and 85 will remain biased in the general direction of arrow 99 despite changes in the magnitude of fluid pressure in the intake manifold 17 and hence the outlet 32.

The slave valve 80 further has a pair of intermediate surfaces 86 and 87 (see FIGS. 5 and 6). Fluid pressure in the second inlet 30 acts upon both the surfaces 86 and 87. In particular, fluid pressure in the second inlet 30 acting on the surface 86 urges the slave valve in the general direction of arrow 99, whereas fluid pressure in the second inlet 30 acting on the surface 87 urges the slave valve 80 in the general direction of arrow 100. The slave valve 80 is preferably configured such that the surface area of the surface 86 is slightly greater in magnitude than the surface area of the surface 87. Thus, the net force exerted by fluid pressure acting on the surfaces 86 and 87 creates a slight bias in the general direction of arrow 99. It should be appreciated that during operation of the internal combustion engine 10, the primary force exerted on the slave valve 80 by fluid pressure on the surfaces 86 and 87 will remain biased in the general direction of arrow 99 despite changes in the magnitude of fluid pressure in the second inlet 30. Therefore, it should be appreciated that the primary force urging the slave valve 80 in the general direction of arrow 100 is the spring bias generated by the second spring 82. Whereas, the primary force urging the slave valve 80 in the general direction of arrow 99 is the sum of the bias created by pressure exerted by fluid in the outlet 32 on the surfaces 84 and 85 and the bias created by pressure exerted on the surfaces 86 and 87 by fluid in the second inlet 30.

Similarly, the master valve 60 further has a pair of intermediate surfaces 120 and 122 (see FIGS. 5 and 6). Fluid pressure within the first inlet 28 acts upon both of the surfaces 120 and 122. In particular, fluid pressure in the first inlet 28 acting on the surface 120 urges the master valve 60 in the general direction of arrow 99, whereas fluid pressure in the first inlet 28 acting on surface 122 urges the master valve 60 in the general direction of arrow 100. The master valve 60 is preferably configured such that the surface area of the surface 120 is slightly greater in magnitude than the surface area of the surface 122. Thus, the net force on the master valve 60 as a result of fluid pressure acting on the surfaces 120 and 122 creates a slight bias in the general direction of arrow 99. Therefore, it should be appreciated that the primary force urging the master valve 60 in the general direction of arrow 100 is the spring bias generated by the first spring 46, whereas the primary force urging the master valve 60 in the general direction of arrow 99 is the sum of the bias exerted by fluid pressure in the first inlet 28 acting on the surfaces 120 and 122 and the bias exerted by fluid pressure in the outlet 32 acting on the surfaces 110, 112, 114, and 116.

Such a configuration allows for rapid opening and closing of the EGR valve assembly 14. In particular, once the spring biases of the spring 46 and spring 82 have been removed or otherwise reduced by the solenoid 50, the master valve 60 and the slave valve 80 may be quickly moved in the general direction of arrow 99 thereby providing for rapid opening of the EGR valve assembly 14. The master valve 60 and the slave valve 80 may then be quickly moved in the general direction of arrow 100 by actuation of the solenoid 50 thereby providing for rapid closing of the EGR valve assembly 14.

It should also be appreciated that the magnitude of the spring bias of the spring 46 is predetermined such that the sum of the bias exerted by fluid pressure in the first inlet 28 acting on the surfaces 120 and 122 and the bias exerted by fluid pressure in the outlet 32 acting on the surfaces 110, 112, 114, and 116 is less than the spring bias of the spring 46 under even the most extreme conditions (e.g. the maximum pressure in the exhaust manifold 15). It should further be appreciated that the magnitude of the spring bias of the spring 82 is predetermined such that the bias created by pressure exerted by fluid in the outlet 32 on the surfaces 84 and 85 and the bias created by pressure exerted on the surfaces 86 and 87 by fluid in the second inlet 30 is less than the spring bias of the spring 82 under even the most extreme conditions (e.g. the maximum pressure in the exhaust manifold 16). Therefore, the master valve 60 is maintained in the seated master position by the bias of spring 46 and the slave valve 80 is maintained in the seated slave by the bias of spring 82 under such extreme conditions thereby providing fail safe operation.

Industrial Applicability

In operation, the EGR valve assembly 14 remains in a fail safe mode of operation until the solenoid 50 is actuated. During such fail safe operation, advancement of exhaust gases from the exhaust manifolds 15, 16 to the intake manifold 17 is inhibited. In particular, the first spring 46 biases the master valve 60 into the seated master position which isolates the first inlet 28 from the outlet 32. Moreover, the second spring 82 biases the slave valve 80 into the seated slave position which isolates the second inlet 30 from the outlet 32.

However, it is desirable to inhibit the formation of $NO_x$ under certain engine operating conditions. Hence, during such operating conditions, an engine control module (not shown) associated with the internal combustion engine 10 generates a control signal which is sent to the solenoid 50 thereby causing the plunger 44 to retract in the general direction of arrow 99 of FIGS. 7–9. Actuation of the solenoid 50 compresses the spring 46 thereby removing the spring bias being exerted on the master valve 60. As described above, without the spring bias of the spring 46, the master valve 60 will be urged in the general direction of arrow 99 by fluid pressure in the first inlet 28 and the outlet 32. The master valve 60 moves a short distance D to position the master valve in an intermediate master position shown in FIG. 8. In the intermediate master position, the shoulder 62 of the master valve 60 contacts the surface 84 of the slave valve 80. As the master valve 60 moves toward the surface 84 of the slave valve 80, the master valve 60 moves out of the seated master position thereby allowing exhaust gases to be advanced from the first inlet 28, through the master valve opening 39, and into the outlet 32 in the general direction of arrows 130 of FIG. 8.

As the plunger moves in the general direction of arrow 99, the spring bias associated with the second spring 82 is reduced thereby allowing the master valve 60 to urge the slave valve 80 in the general direction of arrow 99. In particular, the force exerted on the surface 84 of the slave valve 80 by the shoulder 62 of the master valve 60 is greater in magnitude than the reduced spring bias of the second spring 82 acting on the surface 85 of the slave valve 80. Hence, both the master valve 60 and the slave valve 80 move together in the general direction of arrow 99. As shown in FIG. 9, when the master valve 60 and the slave valve 80 move in the general direction of arrow 99, exhaust gases flow from the first inlet 28 in the general direction of arrows 130 into the outlet 32. Exhaust gases also flow from the second inlet 30 in the general direction of arrows 132 into the outlet 32. Due to the coupled movement of the slave valve 80 and the master valve 60, the flow rate of the exhaust gases flowing from the second inlet 30 to the outlet 32 is substantially equivalent to the flow rate of the exhaust gases flowing from the first inlet 28 to the outlet 32. Hence, a first amount of exhaust gas is advanced from the exhaust manifold 15, through the line 74, the first inlet 28, the master valve opening 39, the outlet 32, the line 76, and into the intake manifold 17. A second amount of exhaust gas is also advanced from the exhaust manifold 16, through the line 75, the second inlet 30, the slave valve opening 41, the outlet 32, the line 76, and into the intake manifold 17. It should be appreciated that the first amount of exhaust gases is substantially equal to the second amount of exhaust gases.

At a predetermined time, the engine control module ceases to send the control signal thereby deactuating the solenoid 50. Such deactuation allows the spring 46 to return the plunger 44 to its original position (see FIG. 7). In particular, the spring bias of the spring 46 returns the master valve 60 to the seated master position thus isolating the first inlet 28 from the outlet 32. Similarly, the spring bias of the spring 46 provides the primary force that returns the slave valve 80 to the seated slave position, whereas the second spring 82 provides a secondary force that allows the slave valve 80 to seat independently of the master valve 60 thus isolating the second inlet 30 from the outlet 32. It should be appreciated that both the master valve 60 and the slave valve 80 will remain in their respective seated positions until a subsequent control signal is sent by the engine control module.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the internal combustion engine 10 is herein described as being configured with two separate exhaust manifolds 15, 16, and has significant advantages thereby in the present invention, a single or unified exhaust manifold could replace the manifolds 15, 16. In such a configuration, a single or unified line would replace the lines 74 and 75. The unified line would couple the unified exhaust manifold to both the first inlet 28, and the second inlet 30 of the housing 26 thereby allowing the valve assembly 14 to be used in an internal combustion engine 10 configured with a unified exhaust manifold.

What is claimed is:

1. A valve assembly, comprising:
   a housing defining a chamber, said housing further defining (1) an outlet, (2) a first inlet, and (3) a second inlet, each being in fluid communication with said chamber;
   a master valve positioned within said chamber, said master valve (1) isolates said first inlet from said outlet when said master valve is positioned in a seated master position, and (2) places said first inlet in fluid communication with said outlet when said master valve is located in an open master position; and
   a slave valve positioned within said chamber, said slave valve (1) isolates said second inlet from said outlet when said slave valve is positioned in a seated slave position, and (2) places said second inlet in fluid communication with said outlet when said slave valve is located in an open slave position;
   wherein movement of said master valve from said seated master position to said open master position causes movement of said slave valve from said seated slave position to said open slave position; and
   wherein said master valve moves a distance from said seated master position toward said open master position while said slave valve is positioned in said seated slave position.

2. The assembly of claim 1, wherein:
   said master valve has a pressure compensation channel defined therein, and
   said pressure compensation channel enables fluid communication between said chamber and said outlet when said master valve is located in said seated master position.

3. The assembly of claim 1, wherein:
   said slave valve has a passageway defined therethrough, and
   said master valve is positioned within said passageway.

4. The assembly of claim 3, wherein said housing further defines a plunger opening, further comprising:
   a plunger which extends into said chamber through said plunger opening;
   a first spring positioned within said chamber and interposed between said housing and said plunger, said first spring biases said plunger into contact with said master valve; and
   a second spring positioned within said chamber and interposed between said plunger and said slave valve.

5. The assembly of claim 4, wherein:
   said first spring biases said master valve toward said seated master position, and
   said second spring biases said slave valve toward said seated slave position.

6. The assembly of claim 1, further comprising a first spring and a second spring, wherein:
   said first spring biases said master valve toward said seated master position,
   said second spring biases said slave valve toward said seated slave position,
   pressure at said first inlet biases said master valve toward said open master position, and
   pressure at said second inlet biases said slave valve toward said open slave position.

7. The assembly of claim 3, wherein:
   said master valve includes a shoulder located on an exterior surface thereof, and
   movement of said master valve from said seated master position to said open master position causes said shoulder to contact said slave valve thereby moving said slave valve from said seated slave position to said open slave position.

8. The assembly of claim 7, wherein:
   said shoulder is spaced apart from said slave valve when (1) said slave valve is located in said seated slave position, and (2) said master valve is located in said seated master position.

9. An engine assembly, comprising:
   an internal combustion engine having an engine air inlet, a first engine exhaust outlet, and a second engine exhaust outlet;
   a valve housing defining a chamber, said housing further defining (1) a valve housing outlet, (2) a first valve housing inlet, and (3) a second valve housing inlet, each being in fluid communication with said chamber;
   a master valve positioned within said chamber, said master valve (1) isolates said first valve housing inlet from said valve housing outlet when said master valve is positioned in a seated master position, and (2) places said first valve housing inlet in fluid communication with said valve housing outlet when said master valve is located in an open master position; and
   a slave valve positioned within said chamber, said slave valve (1) isolates said second valve housing inlet from said valve housing outlet when said slave valve is positioned in a seated slave position, and (2) places said second valve housing inlet in fluid communication with said valve housing outlet when said slave valve is located in an open slave position,
   wherein said first engine exhaust outlet is in fluid communication with said first valve housing inlet,
   wherein said second engine exhaust outlet is in fluid communication with said second valve housing inlet,
   wherein said engine air inlet is in fluid communication with said valve housing outlet,
   wherein movement of said master valve from said seated master position to said open master position causes movement of said slave valve from said seated slave position to said open slave position, and
   wherein said master valve moves a distance from said seated master position toward said open master position while said slave valve is positioned in said seated slave position.

10. The assembly of claim 9, wherein:

said master valve has a pressure compensation channel defined therein, and said pressure compensation channel enables fluid communication between said chamber and said valve housing outlet when said master valve is located in said seated master position.

11. The assembly of claim 9, wherein:

said slave valve has a passageway defined therethrough, and said master valve is positioned within said passageway.

12. The assembly of claim 11, wherein said housing further defines a plunger opening, further comprising:

a plunger which extends into said chamber through said plunger opening;

a first spring positioned within said chamber and interposed between said housing and said plunger, said first spring biases said plunger into contact with said master valve; and a second spring positioned within said chamber and interposed between said plunger and said slave valve.

13. The assembly of claim 12, wherein:

said first spring biases said master valve toward said seated master position, and said second spring biases said slave valve toward said seated slave position.

14. The assembly of claim 12, further comprising a first spring and a second spring, wherein:

said first spring biases said master valve toward said seated master position, said second spring biases said slave valve toward said seated slave position, pressure at said first valve housing inlet biases said master valve toward said open master position, and pressure at said second valve housing inlet biases said slave valve toward said open slave position.

15. The assembly of claim 11, wherein:

said master valve includes a shoulder located on an exterior surface thereof, and movement of said master valve from said seated master position to said open master position causes said shoulder to contact said slave valve thereby moving said slave valve from said seated slave position to said open slave position.

16. The assembly of claim 15, wherein:

said shoulder is spaced apart from said slave valve when (1) said slave valve is located in said seated slave position, and (2) said master valve is located in said seated master position.

17. A method of controlling a flow of engine exhaust, comprising the steps of:

providing a valve assembly which includes (a) a housing defining a chamber, the housing further defining (1) a valve housing outlet, (2) a first valve housing inlet, and (3) a second valve housing inlet, each being in fluid communication with the chamber, (b) a master valve positioned within the chamber, the master valve (1) isolates the first valve housing inlet from the valve housing outlet when the master valve is positioned in a seated master position, and (2) places the first valve housing inlet in fluid communication with the valve housing outlet when the master valve is located in an open master position, and (c) a slave valve positioned within the chamber, the slave valve (1) isolates the second valve housing inlet from the valve housing outlet when the slave valve is positioned in a seated slave position, and (2) places the second valve housing inlet in fluid communication with the valve housing outlet when the slave valve is located in an open slave position;

providing an internal combustion engine having an engine air inlet, a first engine exhaust outlet, and a second engine exhaust outlet, wherein (1) the first engine exhaust outlet is in fluid communication with the first valve housing inlet, (2) the second engine exhaust outlet is in fluid communication with the second valve housing inlet, and (3) the engine air inlet is in fluid communication with the valve housing outlet;

moving the master valve a first distance from the seated master position to an intermediate master position while the slave valve is positioned in the seated slave position; and moving the master valve a second distance from the intermediate master position to the open master position so as to cause movement of the slave valve from the seated slave position to the open slave position whereby engine exhaust is enabled to flow from the first and second engine exhaust outlet to the engine air inlet.

18. The method of claim 17, wherein:

the master valve has a pressure compensation channel defined therein, and the pressure compensation channel enables fluid communication between the chamber and the valve housing outlet when the master valve is located in the seated master position.

19. The method of claim 17, wherein:

the slave valve has a passageway defined therethrough, and the master valve is positioned within the passageway.

20. The method of claim 17, wherein:

the master valve includes a shoulder located on an exterior surface thereof, the step of moving the master valve the first distance includes the step of moving the shoulder so as to contact the slave valve, and the step of moving the master valve the second distance includes the step of moving the shoulder so as to cause the slave valve to be moved from the seated slave position to the open slave position.

* * * * *